United States Patent [19]

Rogers et al.

[11] 4,343,723

[45] Aug. 10, 1982

[54] CATALYTIC COMPOSITE FROM PARTIALLY CRYSTALLIZED CLAY

[75] Inventors: Edward S. Rogers, Glen Ellyn, Ill.; Hosheng Tu, Lake Forest, Calif.

[73] Assignee: UOP Inc., Des Plaines, Ill.

[21] Appl. No.: 267,238

[22] Filed: May 26, 1981

Related U.S. Application Data

[63] Continuation-in-part of Ser. No. 130,306, Mar. 14, 1980, abandoned.

[51] Int. Cl.$^3$ .................... B01J 29/06; B01J 21/16
[52] U.S. Cl. ........................... 252/455 Z; 252/450; 423/328
[58] Field of Search ................ 252/455 Z, 450; 423/328

[56] References Cited

U.S. PATENT DOCUMENTS

| | | | |
|---|---|---|---|
| 3,406,124 | 10/1968 | Eastwood et al. | 252/455 |
| 3,472,617 | 10/1969 | McDaniel et al. | 423/118 |
| 3,501,418 | 3/1970 | Magee, Jr. et al. | 252/450 |
| 3,657,154 | 4/1972 | Haden, Jr. et al. | 252/455 Z |
| 3,691,099 | 9/1972 | Young | 252/450 |
| 3,836,561 | 9/1974 | Young | 252/450 |
| 3,867,310 | 2/1975 | Elliott, Jr. et al. | 252/455 Z |
| 3,962,135 | 6/1976 | Alafandi | 252/450 |
| 4,142,994 | 6/1979 | Alafandi | 252/450 |

*Primary Examiner*—Carl F. Dees
*Attorney, Agent, or Firm*—James R. Hoatson, Jr.; Gregory J. Mancuso; William H. Page, II

[57] ABSTRACT

A catalyst composition and a method for its use. The catalyst is a composite of a crystalline aluminosilicate and an inorganic oxide comprising silica and alumina. The catalytic composite is manufactured by crystallizing aluminosilicate throughout an acid treated inorganic oxide. The catalyst is particularly effective in the catalytic cracking of hydrocarbon feedstocks.

18 Claims, 1 Drawing Figure

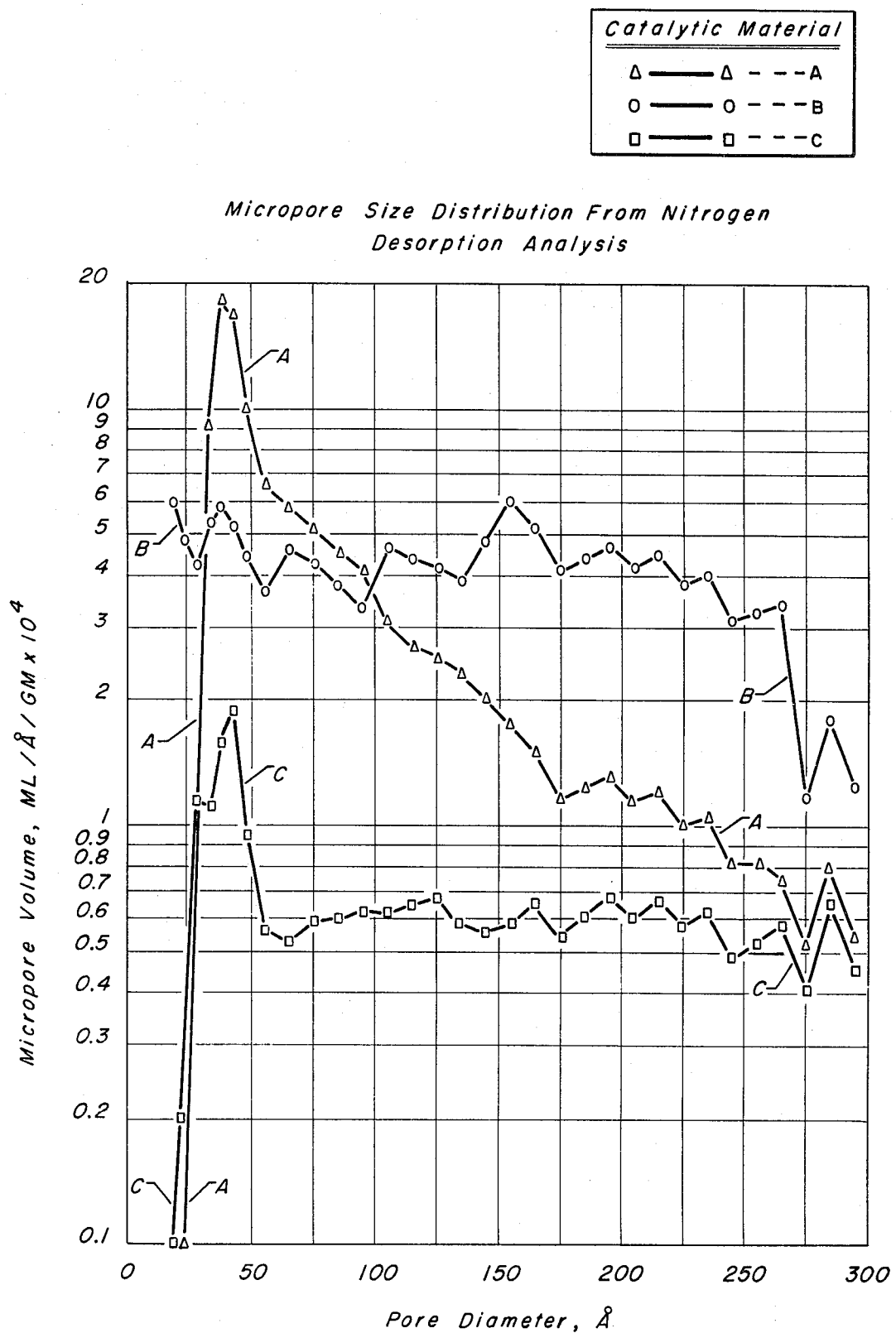

CATALYTIC COMPOSITE FROM PARTIALLY CRYSTALLIZED CLAY

CROSS-REFERENCE TO RELATED APPLICATION

This application is a continuation-in-part of prior copending application Ser. No. 130,306 filed Mar. 14, 1980 and now abandoned, all of the teachings of which are hereby incorporated herein by reference.

BACKGROUND OF THE INVENTION

The field of art to which the invention pertains is catalytic composites. More specifically, the invention relates to a catalytic composite comprising a clay which has been contacted with a strong acid and thereafter partially crystallized.

Hydrocarbon conversion catalysts containing crystalline aluminosilicates (zeolites) have been available for many years. Heretofore, two basic methods of preparing zeolitic containing catalysts have been known. One method involves the mixing of a zeolite, either natural or synthetic, with a matrix such as amorphous silica-alumina hydrogel or clay (Elliot, Jr. et. al., U.S. Pat. No. 3,867,310; Magee, Jr. et. al., U.S. Pat. No. 3,501,418). The other method involves performing particles of a precursor of the desired zeolite structure, and thereafter crystallizing the preformed particles (McDaniel, et. al., U.S. Pat. No. 3,472,617; Haden, Jr. et. al., U.S. Pat. No. 3,657,154).

In the former case, the matrix acts as a binder. The activity of the composite derives mostly from the zeolite crystals admixed with the matrix. One purpose of the matrix is to provide composite catalytic particles of proper size for the particular application. For example, in a fluid catalytic cracking application the catalytic particles must be of such size that they can freely circulate through the fluid catalytic cracking reactor-regenerator system and at the same time be of such size that they are recoverable by cyclones in the regenerator. In addition, zeolites alone are too active for many applications. Because of their high activity the zeolite particles would promote in some applications the formation of excess carbon and high molecular weight compounds which would be deposited on the surface of the zeolite particles. The catalyst would be quickly deactivated as a result. The use of a matrix material allows the manufacture of catalytic composites of proper size with activities lower than those which pure zeolite particles of the same size would display. However, the same properties of the matrix which are advantageous in some circumstances are disadvantageous in others. Admixing a matrix with a zeolite tends to substantially deactivate the zeolite. The deactivation appears to occur because the matrix generally provides no ordered access to reactive zeolite sites. Molecular diffusion of the reactive species to zeolite sites appears to be substantially hindered by even a crystalline matrix material. Thus, although admixture of zeolite and matrices can result in catalytic composites of proper size, the activity level of the resulting composite is lower than has been desired, apparently because much of the zeolite constituent is rendered somewhat inaccessible by the matrix.

Acid treating has been disclosed to improve the pore structure of catalyst composites under some conditions. Particle-form alumina-containing oxides combined with crystalline zeolites have been acid treated to increase their porosity and permeability. (Young, et. al., U.S. Pat. No. 3,836,561) However, many crystalline zeolites are very susceptible to attack by acids, and consequent destruction of the desired crystalline structure. Acid treating of certain clays to alter the pore structure of the clay for use in the preparation of catalyst supports has been disclosed. (Alafandi, U.S. Pat. No. 3,962,135; Alafandi, U.S. Pat. No. 4,142,994) Again, the crystallinity of the clay may be substantially destroyed by the acid treating operation. Acid treating of clays has also been disclosed to increase the acid resistance of composites made using the acid treated clay. (Young, U.S. Pat. No. 3,691,099; Eastwood, U.S. Pat. No. 3,406,124) It appears that simply altering the pore structure of a clay and thereafter admixing the clay with zeolites does not necessarily result in greater accessibility of the zeolites to reactants.

As indicated above, another method which has been disclosed of making hydrocarbon conversion catalysts containing zeolites involves preforming particles of a precursor of the desired crystalline structure, and thereafter crystallizing the precursor particles. Generally, when binderless zeolitic aggregates are formed using starting materials such as silica-alumina and clay, the products have poor attrition resistance. During processing the particles tend to agglomerate, and are subject to mechanical disintegration unless great care is exercised. Typically, the processes are relatively expensive, requiring, for example, a high temperature spray drying step, or high purity starting materials. In addition, the particles are first formed, and then crystallized. The product is a crystal structure with a narrowly limited range of pore sizes, the pore characteristics of which are contributed exclusively by the resulting crystal structure. Another characteristic of crystalline catalysts formed in such a manner is that they are silicate depleted. Because crystallization occurs hydrothermally in an alkaline environment, significant amounts of silicate are removed from the crystal structure, lowering the $SiO_2/Al_2O_3$ mole ratio of the final crystalline product. Since a typical starting material, kaolin clay, has a $SiO_2/Al_2O_3$ mole ratio of 2:1; the structural integrity of the resulting crystal structure is substantially altered by removal of significant amounts of silicate.

What has been needed is a catalytic composite which is derived from clay, can be prepared in powder form or a range of particle sizes, has a relatively uniform distribution of pore volumes over a wide range of pore sizes, a relatively high activity, and a silica to alumina ratio which is at least as great as the clay from which it is derived. The catalytic composite of this invention satisfies these requirements. Further, the catalytic composite of this invention is unexpectedly easy to produce, and can be manufactured less expensively than many other catalytic composites intended for similar use.

SUMMARY OF THE INVENTION

This invention is a novel catalytic composite with a substantially more uniform distribution of pore volumes over a broad range of pore diameters, with an activity at least comparable to other catalytic composites, and which is relatively simply prepared from inexpensive and easily obtainable materials.

In brief summary, our invention is, in one embodiment, a catalytic composite comprising a crystalline aluminosilicate and an inorganic oxide comprising silica and alumina said aluminosilicate comprising between about 10% and about 90% by weight of said composite, and, with respect to pores of said composite with diameters within the range of between 25 and 250 angstroms, greater than half the volume of said pores being in pores with diameters greater than 70 angstroms.

In another embodiment, our invention comprises a catalytic composite manufactured by a method comprising:

(a) contacting an inorganic oxide containing alumina and silica with an acid;

(b) preparing a reaction mixture by mixing the contacted inorganic oxide from step (a) with water and an alkali metal hydroxide; and, (c) reacting said reaction mixture for a period sufficient to produce from about 10% to about 90% by weight of the crystalline zeolite which may be produced theoretically from said reaction mixture.

In a third embodiment, our invention comprises a method of treating a hydrocarbon stream with the foregoing catalytic composite.

Other objectives and embodiments of our invention are discussed below.

DESCRIPTION OF THE INVENTION

The inorganic oxide comprising silica and alumina acts as a matrix for the crystalline aluminosilicate, holding the aluminosilicate crystals together and allowing the creation of particles of the desired size. The inorganic oxide serves the equally important function of contributing to the pore structure of the catalytic composite. The crystalline aluminosilicates within the inorganic oxide create pores of various sizes throughout the catalytic composite, and thereby facilitate the contacting of reactants with the catalytically active crystalline aluminosilicate.

The catalytic composite of this invention is manufactured by treating an inorganic oxide comprising alumina and silica in such a manner, as described in more detail below, that aluminosilicates crystallize within the inorganic oxide. The product of the in-situ crystallization is a composite of an inorganic oxide containing silica and alumina throughout which is dispersed crystalline aluminosilicates. The alumina content of the inorganic oxide of the composite is lower than the alumina content of the inorganic oxide prior to treatment.

The inorganic oxide from which the composite is made can be any material which contains sufficient alumina and silica such that aluminosilicate can be crystallized therefrom. Suitable inorganic oxides include allanite, allophane, amphibole, analcime, bentonite, chabazite, chlorite, epidote, feldspar, gmelenite, halloysite, heulandite, idocrase, jeffersite, kaolins (anauxite, dickite, lithomarge, nacrite), kyanite, laumontite, mesolite, micas, natrolite, pyrophyllite, sillimanite, smectite, stilbite, thomsonite, and others.

Clay is a particularly suitable inorganic oxide because it is comparatively inexpensive and because it is relatively easy to produce satisfactory crystalline aluminosilicates from clay. Clays are minerals of fine-grained aluminosilicate crystals, usually referred to as microcrystals, many of which have cross-sectional dimensions in the range of two microns. Seven clay mineral groups are generally recognized to exist: kaolin, illite, montmorillonite or smectite, chlorite, vermiculite, sepiolite, and attapulgite.

The particular clay used is not critical, so long as crystalline aluminosilicates can be produced using it. Preferred clays are those of the kaolin family. This family of clays broadly encompasses naturally occurring clays containing any of the minerals kaolinite, halloysite, anauxite, dickite, nacrite, and the like or a combination of these minerals as their predominant constituent. Small percentages of montmorillonite are frequently admixed with kaolin. Kaolin minerals are silica alumina compounds having a composition represented by the formula:

$$Al_2O_3:2SiO_2:xH_2O$$

where x is the degree of hydration and is typically in the range of from about 2 to about 4. In addition to the silica and alumina components, the kaolin clays also may contain minor amounts of other components, particularly, iron, calcium, magnesium or alkali metals. Depending upon the source of the kaolin, the amounts of such components, and of silica and alumina within the kaolin will vary slightly. The principal species of the kaolin group is kaolinite, a layered silicate composed of hexagonal flakes, each flake made up of layers. The atomic structure of most clay minerals consists of tetrahedrons of silica and octahedrons of alumina, oxygen atoms being at each corner of the structures.

The crystalline aluminosilicates of the catalytic composite of this invention can be any crystalline aluminosilicate capable of acting as a catalyst, including those commonly referred to as zeolites or molecular sieves. Crystalline aluminosilicates have a three-dimensional interconnecting network structure of silica and alumina tetrahedra. The tetrahedra are formed by four oxygen atoms surrounding silicon or aluminum atoms. Each oxygen atom has two negative charges, each silicon has four positive charges. This structure permits an ordered sharing arrangement, building tetrahedra uniformly in four directions.

In the crystalline structure, up to half of the quadrivalent silicon atoms can be replaced by trivalent aluminum atoms. By regulating the ratios of the silica and alumina starting materials, it is possible to produce aluminosilicates containing different ratios of silicon to aluminum ions and different crystal structures containing various cations.

In hydrated form, the crystalline aluminosilicates generally encompass those represented by the formula:

$$M_{2/n}O:Al_2O_3:wSiO_2:yH_2O$$

where "M" is a cation which balances the electrovalence of the aluminum-centered tetrahedra and which is generally referred to as an exchangeable cationic site, "n" represents the valence of the cation M, "w" represents the moles of $SiO_2$, and "y" represents the moles of water. The generalized cation "M" may be monovalent, divalent or trivalent or mixtures thereof.

In the most common commercial crystalline aluminosilicate, zeolite Type A, the tetrahedra are grouped to form a truncated octahedron with a silica or alumina tetrahedron at each point. This structure is known as a sodalite cage.

When sodalite cages are stacked in simple cubic forms, the result is a network of cavities approximately 11.5 Å in diameter, accessible through openings on all six sides. These openings are surrounded by eight oxygen atoms. In the sodium form, this ring of oxygen atoms provides an opening "window" of 4.2 Å in diameter into the interior of the structure.

Another form of crystalline aluminosilicate commonly used commercially is zeolite Type X. The crystal structure of the Type X zeolite is built up by arranging the basic sodalite cages in a tetrahedral stacking with bridging across the twelve membered ring in which six oxygen atoms alternate with six Si or Al atoms. These rings provide openings or "windows" 9-10 Å in diameter into the interior of the structure.

A third type of crystalline aluminosilicate of wide commercial importance is the zeolite Type Y. The $SiO_2/Al_2O_3$ mole ratio for Type Y zeolites can be from about 3 to about 6.

Essentially, any crystalline aluminosilicate can be used in this invention. Illustrative are Zeolite X, U.S. Pat. No. 2,882,244, Zeolite Y, U.S. Pat. No. 3,130,007, Zeolite A, U.S. Pat. No. 2,882,243, Zeolite L, Bel. Pat. No. 575,117, Zeolite D, Can. Pat. No. 611,981, Zeolite R, U.S. Pat. No. 3,030,181, Zeolite S, U.S. Pat. No. 3,054,657, Zeolite T, U.S. Pat. No. 2,950,952, Zeolite Z, Can. Pat. No. 614,995, Zeolite E, Can. Pat. No. 636,931, Zeolite F, U.S. Pat. No. 2,995,368, Zeolite O, U.S. Pat. No. 3,140,252, Zeolite B, U.S. Pat. No. 3,008,803, Zeolite Q, U.S. Pat. No. 2,991,151, Zeolite M, U.S. Pat. No. 2,995,423, Zeolite H, U.S. Pat. No. 3,010,789, Zeolite J, U.S. Pat. No. 3,011,869, Zeolite W, U.S. Pat. No. 3,012,853, Zeolite KG, U.S. Pat. No. 3,056,654, and Omega, Can. Pat. No. 817,915. Illustrative of other suitable crystalline aluminosilicates are levynite, dachiardite, erionite, faujasite, analcite, paulingiet, noselite, ferrierite, haulandite, scolecite, stilbite, clinoptilolite, harmotone, phillipsite, brewsterite, flakite, datolite, gmelinite, cancrinite, leucite, lazurite, mesolite, ptilolite, nepheline, natrolite, sodalite, mordenite, chabazite, and the like. Crystalline aluminosilicates presently preferred due to their chemical, physical and catalytic properties are the large pore types in which a predominance of the pore volume is constituted by pores having diameters in excess of about 4 angstroms, usually between about 4 and about 16 angstroms. Among these, the most preferred are the ones having structures similar to faujasite, such as faujasites X and Y, and zeolites A, L, T, Omega and the like.

To crystallize faujasite using a clay, it is preferred that the clay be kaolin. It is especially preferred that at least part of the clay be metakaolin, the dehydrated form of kaolin. Dehydration of kaolin to form metakaolin can be accomplished by calcining kaolin at a temperature in the range of 1200° F. to 2000° F. until substantially all the water is removed. Kaolin clay converts to metakaolin at about 1022° F. The calcination can be performed by any of the well-known conventional means for calcining clay. The conversion from kaolin to metakaolin need not be complete. It appears that even small amounts of metakaolin aid in the crystallization of the faujasite form of crystalline aluminosilicate.

The catalytic composite of this invention can be prepared in the following manner. First, an appropriate inorganic oxide comprising silica and alumina is selected. As stated above, the preferred inorganic oxide is clay. The fundamental requirement of the selected inorganic oxide is that it be of the appropriate type to allow the in-situ crystallization of the desired aluminosilicates. It is also necessary that the inorganic oxide contain sufficient alumina and silica to allow crystallization of aluminosilicates. However, the precise silica and alumina content of the inorganic oxide is not critical. Supplemental silica and/or alumina may be added to the inorganic oxide to provide the proper ratio of silica to alumina to yield the desired aluminosilicates. In addition, the silica to alumina ratio of the inorganic oxide is influenced by the acid treating step discussed more fully below. It is a relatively simple matter to select the appropriate inorganic oxide, the appropriate amounts of additional silica and alumina if necessary, and the appropriate degree of acid treating, to obtain the desired crystalline aluminosilicates.

The appropriate selected inorganic oxide or combination of oxides is treated with an acid. It appears that the acid reacts with the alumina of the inorganic oxide to reduce the alumina content of the inorganic oxide.

Essentially any acid which can react with alumina can be employed. Exemplary of these are the strong mineral acids such as hydrochloric, sulfuric, orthophosphoric and nitric acids, and organic mono- and polycarboxylic acids such as formic, acetic, citric, oxalic, tartaric, succinic, malonic, nitriloacetic and the like.

It is generally preferred to remove at least about 5% of the alumina content of the inorganic oxide. It is especially preferred to remove at least about 50% of the alumina content of the inorganic oxide. The proportion of the alumina content which may be removed to obtain satisfactory results of course depends upon the silica to alumina ratio of the inorganic oxide. The lower the silica to alumina ratio of the inorganic oxide, the lower the proportion of the alumina content which can be removed without sacrificing the structural integrity of the inorganic oxide. It is preferred that the catalytic composite have a weight ratio of silica content to alumina content of at least about 2, and preferably from about 2.5 to about 10. In an organic oxide such as kaolin which has a silica to alumina ratio of about 2:1, it is expected that substantially all of the alumina content of the inorganic oxide may be removed and yet maintain satisfactory structural integrity of the remaining inorganic oxide.

Accordingly, the acid strength or pH, reaction temperature and time should be correlated with the acid tolerance of the inorganic oxide, to preserve the desired physical structure. Conversely, these conditions should be sufficiently severe to react at least 5 relative percent of the alumina present in the inorganic oxide so that a significant variation in physical properties will result from this treatment.

As stated above, the catalytic composite of this invention can be prepared in a range of particle sizes. For some applications, it is desirable that the catalytic composite be in powder form. For example, the catalytic composite in powder form can be used as a catalyst precursor to be admixed or compounded with other constituents, such as a binder, to form a mass capable of being formed into discrete particles by extrusion, marumerizing, or otherwise. In such a case, the powdered catalytic composite can be easily formed by employing powdered inorganic oxide of appropriately small particulate size, and contacting the inorganic oxide and acid by slurrying the powdered inorganic oxide with the acid. It is preferred that the cataytic composite have a cross sectional dimension of between about 0.5 microns and about 10 microns, and more preferably between about 1 micron and 5 microns.

For other applications, it is desirable that the catalytic composite be in particulate form having a cross sectional dimension greather than about 10 microns. In this case, the inorganic oxide is formed into particles of any desired size and shape by any conventional or otherwise convenient means. The particles are then contacted with acid and further processed as described herein. The size and shape of the catalytic composite will correspond to the size and shape of the formed particles of inorganic oxide.

The acidity of the acid medium should correspond to a pH of less than about 5, usually less than about 4 and preferably below about 3. The degree of reaction at any given set of conditions will, of course, depend upon the acid concentration. Thus, a greater degree of alumina abstraction will result at the lower pH levels. However, as already observed, excessive acid reaction can diminish desirable properties of the inorganic oxides, such as crush strength. Thus the selection of pH, acid type, reaction temperature, and duration of contacting depends upon the stability of the inorganic oxide, or other constituents and the degree of alumina abstraction desired. The optimum values of these variables can be readily determined. These evaluations can be accomplished empirically by exposing several portions of the inorganic oxide to acidic media of differing pH. For an example, the oxide may be reacted with aqueous HCl at pH 3.4, 3.0 and 2.6, at several different temperatures and reaction times. Each of the products can then be collected, washed, and analyzed to evaluate physical properties such as porosity, permeability, bulk density and crushing strength. These results will then enable the determination of the optimum conditions for treating that particular oxide or combination of oxides.

The amount of acid required is a function of the amount of alumina in the inorganic oxide which theoretically can react with the acid selected. For example, for a divalent acid such as sulfuric acid, three moles of acid are required per mole of alumina desired to be removed, as illustrated by the following equation:

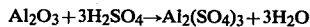

$$Al_2O_3 + 3H_2SO_4 \rightarrow Al_2(SO_4)_3 + 3H_2O$$

The acid also serves to remove trace metallic constituents from the inorganic oxide, and therefore the amount of acid required will be influenced by the metals content of the inorganic oxide.

Acid treating of the inorganic oxide reduces the alumina content of the inorganic oxide. The acid treated inorganic oxide can be characterized quantitatively as an inorganic oxide having a higher relative silica content, a lower bulk density, and a greater pore volume and surface area than the inorganic oxide from which it derived. The quantitative differences in the foregoing characteristics between the untreated and treated inorganic oxide of course are a function of the type of inorganic oxide selected and its susceptibility to acid treatment, the amount, type and strength of acid used, and the duration and conditions of acid treatment. In the case of kaolin clay inorganic oxide, the acid treated inorganic oxide is essentially a modified kaolin clay.

It is preferred to acid treat the inorganic oxide such that the catalytic composite which is ultimately produced has a pore volume of between about 0.2 and about 0.7 cc/g, and has a surface area from about 150 $m^2/g$ to about 500 $M^2/g$.

The particular procedure by which the inorganic oxide is contacted with the acid is not critical. The acid treatment may be effected by adding an acid which reacts with alumina, such as hydrochloric acid, nitric acid or sulfuric acid, and preferably the latter, of moderate to strong concentration to an aqueous slurry of the inorganic oxide or by adding the slurry to the acid. Alternatively, dilute acid may be added directly to the inorganic oxide. Precolation of acid through the inorganic oxide is one of the other possible methods of contacting the acid with the inorganic oxide. The weight ratio of acid to inorganic oxide may be from about 0.2:1 to about 1:1 although higher ratios may also be employed. Ratios in the range of about 0.6:1 to about 1:1 are preferred. Treatment is preferably carried out at an elevated temperature at from about 100° F. to about the boiling point of the acid mixture. The inorganic oxide may be permitted to soak in the acid or any known leaching or extracting procedure may be employed. Following the acid treatment step, the inorganic oxide residue after separation from the filtrate may be washed with water in order to remove soluble aluminum and other metallic salts, e.g., calcium, magnesium and iron salts. In some instances, the washing step may be eliminated. The necessary duration of the acid contacting varies widely. Normally, from about 0.5 to about 16 hours is required. In treating the preferred inorganic oxide, kaolin clay, with acid, the preferred acid is sulfuric acid. Especially preferred is an aqueous solution containing equal amounts of 95% $H_2SO_4$ and kaolin in which the acid is first diluted by addition to an equal weight of water. In such a mixture the heat of hydration of the sulfuric acid, and the heat of reaction of the clay in the acid, supplies substantialy all of the energy to maintain the preferred reaction temperature of about 200° F. At this composition and temperature, a contact time of about one hour is preferred.

After the step of contacting the acid with the inorganic oxide, crystalline aluminosilicate is formed on and within the treated inorganic oxide. A variety of methods can be used to crystallize the aluminosilicate. To encourage crystal formation, techniques can be used such as seeding the inorganic oxide with small amounts of aluminosilicate crystals. To form the desired species of crystalline aluminosilicate, silica and/or alumina containing materials may be admixed with the inorganic oxide to modify its silica to alumina ratio.

A particularly convenient method for forming crystalline aluminosilicate throughout the inorganic oxide involves first slurrying the inorganic oxide with water. It is preferred that a water to inorganic oxide weight ratio of from about 6:1 to about 4:1 be used. Thereafter, an alkali metal hydroxide is admixed with the slurry. The amount of alkali metal hydroxide used should be approximately that necessary to produce the desired crystalline aluminosilicate. It is preferred that an aqueous solution of a strong alkali metal hydroxide of high pH be used, such as sodium hydroxide dissolved to about 20% by weight in water. The resulting slurry should be mixed or agitated sufficiently to thoroughly disperse or dissolve the constituents.

The amount of silica, alumina, alkali metal hydroxide and water in the slurry should be those relative amounts which will produce the desired crystalline aluminosilicate. The necessary relative amounts are easily determined either by reference to the substantial body of literature relating to the production of crystalline aluminosilicates, or by simple trial and error. For example, Elliot, Jr., U.S. Pat. No. 3,867,310 discusses the range of ratios of alumina to silica, to alkali metal hydroxide appropriate for the crystallization of faujasite. To crystallize faujasite having a silica to alumina ratio of 2.4 to about 3.0, it is disclosed that the appropriate range of ratios of silica to alumina is 3 to 5.

Determination of the silica and alumina content of the treated inorganic oxide from which the slurry is made can be accomplished by standard well-known X-ray diffraction analytical techniques.

In the event that amounts of silica or alumina in addition to the amounts of such constituents present in the treated inorganic oxide are required to produce the desired crystalline aluminosilicate, such additional amounts may be supplied by the addition to the slurry of treated inorganic oxide and water of appropriate amounts of compounds which will provide alumina and/or silica. Convenient compounds which can furnish the necessary silica and/or alumina are readily available.

The alumina utilized may be derived from any one of a number of sources such as sodium aluminate, aluminium sulfate, and aluminum chloride. The silica component may be derived from sources such as sodium silicate, silica gel, finely divided silica, and precipitated silica. Particularly convenient are the sodium compounds sodium silicate and sodium aluminate, since they are widely available and readily provide the necessary silica and alumina, respectively, under alkaline reaction conditions. The necessary silica or alumina, if any, may be admixed with the treated inorganic oxide either before or after slurrying the inorganic oxide with water, or after the admixing of alkali metal hydroxide with the slurry. It is notable that the relative amounts of the constituent inorganic oxide, water, alkali metal hydroxide, and supplemental alumina and/or silica, if any, in the reaction mixture are dictated for the most part by the desired crystalline aluminosilicate, and to a much lesser degree by other desired physical properties of either the reaction mixture of the constituents or the ultimate catalytic composite. The reason for this substantial lack of limitation is that the crystallization process does not require spray drying or other sophisticated equipment which limits the physical characteristics, such as viscosity and solids content, of the reaction mixture.

The size of the aluminosilicate crystals which are formed, and the uniformity of their distribution throughout the catalytic composite, can be controlled by such factors as the relative amount of water used in preparing the reaction mixture, the temperature of crystallization, and the duration of crystallization. Larger amounts of water tend to promote the growth of smaller crystals of aluminosilicate. Likewise, slow crystallization through use of lower temperatures tends to produce larger crystals.

After preparation of the reaction mixture, it is thoroughly agitated or mixed to uniformly disperse the constituents throughout the reaction mixture. The agitated reaction mixture is then heated under quiescent conditions to allow the crystallization of aluminosilicate. Although it is preferred to heat the reaction mixture under quiescent conditions, the mixture can be heated during mixing or agitation. However, the crystals produced by the latter method will not be as uniform in size or quality as those produced by heating under quiescent conditions.

The temperature range within which satisfactory aluminosilicate crystals can be produced varies widely, from about 100° F. to about the boiling point of the reaction mixture. It is preferred, however, to use temperatures in the range of about 150° F. to about 225° F. Although substantially complete crystallization of the reaction mixture can be accomplished, it is preferred that the reaction mixture be allowed to react until there is present in the reaction mixture from about 10% by weight to about 90% by weight of the crystalline aluminosilicate which may be produced theoretically from the reaction mixture. Any conventional heating apparatus can be used to heat the reaction mixture.

It is possible to obtain satisfactory results by adding to the reaction mixture crystalline aluminosilicates. Such crystalline aluminosilicates can be added in small quantities to serve as seed crystals to facilitate the growth of the desired crystalline aluminosilicate, or in larger quantities to supplement the crystalline aluminosilicate formed on and throughout the reaction mixture. Because the inclusion in the reaction mixture of small amounts of the desired crystalline aluminosilicate facilitates the growth of aluminosilicate crystals, and substantially reduces the reaction time, it is preferred that such seed crystals be included within the reaction mixture. However, it is preferred that only such amounts of crystalline aluminosilicate as will serve as seed crystals be included within the reaction mixture. Because of the advantageous results obtained by producing substantially all the crystalline aluminosilicate of the catalytic composite from the reaction mixture, it is preferred not to include within the reaction mixture supplemental crystalline aluminosilicate other than that necessary to facilitate crystal formation.

In using a seeding technique, a first reaction mixture is prepared by reacting silica-alumina alkali metal hydroxide and water in appropriate ratios under conditions of time and temperature which yield a finely divided silica-alumina seed particle having a particle size of less than about 0.1 micron. These seed particles are extremely active in the rapid promotion of crystalline aluminosilicate, a standard aluminosilicate precursor reaction mixture such as that described above. A more detailed discussion of the seeding technique as applied to the production of faujasite is set forth in Elliot, Jr., U.S. Pat. No. 3,639,099.

It is preferred that substantially all of the zeolite present in the catalytic composite be in particle sizes of between about 0.01 micron and 0.5 micron. It is especially preferred that substantially all of the zeolite present in the catalytic composite be in particle sizes of between about 0.05 micron and about 0.3 micron.

During heating of the reaction mixture, samples of the reaction can be analyzed periodically to monitor the progress of crystallization of aluminosilicates.

The determination of the percent crystallinity of the reaction mixture is determined by utilization of standard surface area measurement or X-ray diffraction techniques. For example, to determine the actual reaction period to be utilized in the production of crystalline aluminosilicate, the reaction mixture is first reacted under conditions wherein the substantial theoretical amount of the crystalline aluminosilicate, that is the maximum amount of crystalline aluminosilicate obtainable from such reaction mixture, is prepared. The crystallinity of the aluminosilicate is determined and is arbitrarily considered to possess 100% crystallinity. Since surface area is substantially proportioned to crystallinity, this sample will possess, for example, in the case of faujasite, maximum surface area usually 800–900 $m^2/g$ as determined by standard nitrogen adsorption methods. Next a series of similar preparations is made wherein the reaction period is terminated after various increments of time less than that necessary to produce the theoretical amount of crystalline aluminosilicate. The X-ray patterns and/or surface areas for these products are determined and compared with that obtained for a fully crystallized aluminosilicate batch. The percent of crystallinity is readily obtained for these partially crystalline products by comparing the peak X-ray heights or areas and/or surface areas obtained for the partially crystalline material with that obtained for the arbitrarily stated 100% crystalline material.

The partially crystalline aluminosilicate is described as having a percentage of the maximum crystallinity. For example, a product having a surface area of 200 $m^2/g$ is described as possessing 25% crystallinity of a fully crystallized product which possesses a surface area of 800 $m^2/g$, i.e. percent crystallinity $=200\ m^2/g/800\ m^2/g \times 100 = 25\%$.

X-ray analytical technique is discussed by E. F. Kaeble, "Handbook of X-rays," McGraw-Hill Book Co., N.Y. Nitrogen adsorption techniques are discussed by H. W. Daeschner and F. H. Stross, Anal. Chem. 34, (1962).

After the crystallization in the reaction mixture has progressed to the desired degree, the reaction is terminated and the reaction mixture filtered, washed and dried. Filtration can be by any conventional means, care being taken to ensure that the filter medium is sufficiently fine to collect substantially all of the solids. The filtered solids material is thereafter washed to remove substantially all the excess alkali metal salts. The washing medium can be water, an ammonium salt solution, or any other liquid capable of removing the excess salts. Water is preferred because of convenience. In the case of water washing, washing is continued until the pH of the wash effluent is neutral. Drying of the washed filter cake may be accomplished by any conventional or convenient means, such as an oven, a vacuum apparatus, or a belt dryer which passes through a flow of hot gases.

The resulting catalytic composite comprises aluminosilicate (zeolite) crystals in a silica and alumina containing inorganic oxide from which the aluminosilicate crystals were derived. The relative silica content of the catalytic composite is subtantially greater than the silica content of the precursor inorganic oxide. The pore structure of the catalytic composite of this invention is substantially improved over the pore structure of either the precursor inorganic oxide or crystalline aluminosilicates in general. The total pore volume of pores of any given diameter, within a broad range of pore diameters, is relatively constant. In addition, the pore volume at particular pore diameters, over a wide range of pore diameters, is greater than the pore volumes at the same pore diameters of alumina and silica containing inorganic oxides. The result is a catalytic composite with unexpectedly superior pore characteristics relative to inorganic oxides, aluminosilicates, or simple mixtures thereof. In particular, the characteristics of the catalytic composite of this invention include greater than half the volume of pores of the catalytic composite, with respect to pores with diameters within the range of 25 to 250 angstroms, being in pores with diameters greater than about 70 angstroms; the difference between the maximum and minimum volume of pores of any pore diameter, within the same range of pore diameters, being less than about 30%; and a pore volume of from about 0.2 ml/g to about 0.7 ml/g, with respect to pores of less than about 300 angstroms in diameter. A catalytic composite can be made with a surface area of at least about 150 $m^2/g$ to about 500 $m^2/g$.

It appears that the reason for the improved pore structure relates in particular to the method by which aluminosilicates are incorporated in the catalytic composite. It is believed that as the aluminosilicates crystallize the silica, alumina, and alkali metals constituents are pulled away from their respective locations in the inorganic oxide to form the aluminosilicates. The crystallization operation thus creates pores throughout the inorganic oxide in addition to the voids which exist as a result of the acid contacting operation. A composite is thereby created which incorporates pores existing naturally in the inorganic oxide, pores resulting from the acid contacting, and pores arising from the crystallization of aluminosilicates.

The superior pore structure of the catalyst of this invention is highly advantageous in many hydrocarbon treating operations. Processes operating at high temperatures as, for example, petroleum cracking, reforming, hydrocracking, and hydrodesulfurization, operate with feedstocks which result in coke deposition. Such feedstocks in many cases contain metals or metal compounds, for example, nickel, copper, iron and other catalytic elements or compounds as for example, oxides and sulfides and vanadium, which as such or as a result of reaction are converted into compounds which deposit in the pores of the catalyst. As stated above, aluminosilicates have effective pore diameters in the range of up to about 10 angstroms. However vacuum gas oil, for example, has an average molecular size of about 15 angstroms. Admixing aluminosilicates with inorganic oxides which have pore diameters in the range of 80 angstroms but with pore volumes of only about 0.3 ml/g in pores of less than about 300 angstroms in diameter, results in composites with a very non-uniform pore structure. The improved distribution of pore volumes of the catalytic composite of this invention results in more ready accessibility of reactants to reactive sites, and permits a more ready escape of the products of the reaction, thus minimizing pore obstruction by coke formation and metals deposition.

Processes in which the catalytic composite of this invention are useful include processes for the conversion of organic compounds, particularly hydrocarbons. Exemplary of hydrocarbon conversion systems in which these compositions are particularly suitable are catalytic cracking, hydrocracking, hydrofinishing, hydrotreating, e.g. desulfurization and denitrogenation, isomerization, polymerization, hydrogenation, dehydrogenation and the like.

EXAMPLE I

One embodiment of the catalytic composite of this invention was prepared as follows. Kaolin clay was calcined for 3 hours at 1150° F. to effect partial conversion to metakaolin. The kaolin contained 46.5% $SiO_2$, 37.3% $Al_2O_3$, 13.9% $H_2O$, with the balance comprising CaO, MgO, $TiO_2$, and $Fe_2O_3$. In 5000 ml of water, 1500 g of the calcined clay was mixed with 1900 g of a commercial 95% $H_2SO_4$. The mixing was performed at 90° F. and continued for 1 hour. The mixture was then filtered and the solid filter cake washed with water until a pH of about 7 was observed in the wash water effluent. Analysis of a dried sample of the filter cake showed it to contain 64.8% $SiO_2$, 33.0% $Al_2O_3$, and 0.5% $SO_3$.

The clay filter cake was mixed with water to obtain a slurry with a total water content of 7200 ml. Thereafter, 800 g of sodium hydroxide was admixed with the clay-water slurry. Seed crystals were thereafter admixed with the resulting slurry, and the resulting mixture was agitated for 1 hour with a mechanical agitator. The agitated mixture was then heated to 205° F. in a quiescent state, and thereafter maintained at that temperature and in that state for an 18 hour period. Samples were taken at the end of the 18 hour period, and during that period after 10 and 14 hours. The samples were filtered, washed with water until the wash effluent was of a neutral pH, and dried in a vacuum apparatus at room temperature. The dried samples were analyzed by X-ray diffraction for the type of crystal structure and the total amount of faujasite zeolite. The X-ray diffraction results are expressed in terms of % Y faujasite, relative to a reference standard of substantially pure Y faujasite. A verification of the validity of the X-ray diffraction results was obtained by surface area analysis using nitrogen adsorption/desorption techniques. A portion of the 14-hour sample was analyzed by this method, and the result found to correspond with that of the X-ray diffraction analysis. The results of the analyses are set forth in Table I below.

TABLE I

| Time (hrs.) | Y Faujasite Crystals (by X-ray) | Other Crystals (by X-ray) |
|---|---|---|
| 10 | 5% | none |
| 14 | 32*% | none |
| 18 | 36% | 1 unidentified |

*verified by nitrogen adsorption/desorption analysis as 31.2% faujasite.

EXAMPLE II

The embodiment of the catalytic composite of this invention described in Example I was tested to determine its activity in a pilot plant fixed bed reactor system under conditions designed to represent fluid catalytic cracking conditions. A discussion of microactivity testing appears by F. G. Ciapetta et. al. in *Oil & Gas Journal*, Oct. 16, 1967. Also tested, for comparative purposes, were a commercially available fluid catalytic cracking catalyst not of this invention, and a sample of the kaolin clay used as a precursor in Example I. The operating conditions for the tests are set forth in Table II. The results of the tests are set forth in Table III, the catalyst labelled "A" representing the commercially available fluid catalytic cracking catalyst, the catalyst labelled "B" representing the catalyst composite of this invention, and the catalyst labelled "C" the kaolin clay sample.

TABLE II

| Weight of Catalyst, Grams | 4.0 |
|---|---|
| Feedstock Type | Vacuum Gas Oil |
| Weight of Feedstock, Grams | 1.24 |
| Reactor Temperature, °F. | 900 |
| WHSV, hr$^{-1}$ | 14.5 |
| Flow Direction | Down |
| Catalyst/Oil Ratio | 3.23 |

TABLE III

| Catalyst | A | B | C |
|---|---|---|---|
| wt. % conversion | 91.89 | 84.23 | 49.24 |
| Product Distribution, wt. % | | | |
| $C_2-$ | 4.18 | 3.14 | 0.99 |
| $C_3$ | 8.46 | 9.19 | 5.06 |
| $C_4$ | 15.20 | 14.77 | 8.24 |
| $C_5$—EP Gasoline | 50.78 | 44.87 | 31.71 |
| Cycle Oil | 8.11 | 15.77 | 50.76 |
| Coke | 13.27 | 12.26 | 3.24 |
| Hydrogen Yield, SCFB | 44.8 | 53.2 | 43.8 |

EXAMPLE III

Further comparisons of the commercially available fluid cracking catalyst referred to in Example II (labelled "A"), the catalytic composite of this invention (labelled "B"), and the kaolin clay precursor of the catalytic composite of Example I (labelled "C") are presented in semi-logarithmic graphical form in the attached drawing, and in tabular form in Table IV. The data represented in the drawing and table were obtained using well-known nitrogen adsorption/desorption techniques. The graphical data present a comparison between the three materials of the total volume of pores of specific sizes in terms of milliliters per angstrom per gram of material. The tabular data present a comparison between the three materials of their respective surface areas, total pore volumes, and average pore diameters.

TABLE IV

| Catalyst | SA ($m^2$/g) | PV (ml/g) | PD (A) |
|---|---|---|---|
| A | 292 | 0.1642 | 22.5 |
| B | 365 | 0.2240 | 24.6 |
| C | 16.6 | 0.0331 | 79.6 |

Comparison of the results of the foregoing examples clearly indicates the unexpected superiority of the catalytic composite of this invention. The pore volume distribution of the catalytic composite of this invention is substantially more uniform than the typical commercial catalyst to which it is compared. Furthermore, the total pore volume of the catalytic composite of this invention is greater than the pore volume of the kaolin clay from which the catalytic composite of this invention is derived. Finally, the microactivity test shows that the catalytic composite of this invention displays an activity comparable to the commercial catalyst to which it is compared.

We claim as our invention:

1. A catalytic composite comprising a crystalline aluminosilicate zeolite and an inorganic oxide comprising silica and alumina, said zeolite comprising between about 10% and about 90% by weight of said composite, said composite having pores with diameters within the range of between 25 and 250 angstroms, more than half the volume of said pores having a diameters greater than about 70 angstroms.

2. The catalytic composite of claim 1 wherein substantially all of said aluminosilicate is present in particle sizes of between about 0.01 micron and about 0.5 micron.

3. The catalytic composite of claim 1 wherein said composite has a weight ratio of silica content to alumina content of at least about 2.

4. The catalytic composite of claim 1 wherein said composite has a weight ratio of silica content to alumina content of from about 2.5 to about 10.

5. The catalytic composite of claim 1 wherein, with respect to pores of said composite with diameters within the range of between 25 and 250 angstroms the maximum volume of the pores of any pore diameter and the minimum volume of the pores of any pore diameter do not differ from the average volume of pores within said range by more than about 30%.

6. The catalytic composite of claim 1 wherein said composite has a cross sectional dimension of between about 0.5 micron and about 10 microns.

7. The catalytic composite of claim 1 wherein said composite has a pore volume of more than about 0.2 ml/g, with respect to pores of less than about 300 angstroms in diameter.

8. The catalytic composite of claim 1 wherein said composite has a pore volume of between about 0.2 ml/g and 0.7 ml/g, with respect to pores of less than about 300 angstroms in diameter.

9. The catalytic composite of claim 1 wherein said composite has a surface area of from about 150 m²/g to about 500 m²/g.

10. The catalytic composite of claim 1 manufactured by a method comprising:
   (a) contacting an inorganic oxide containing alumina and silica with an acid;
   (b) preparing a reaction mixture by mixing the contacted inorganic oxide from step (a) with water and an alkali metal hydroxide; and,
   (c) reacting said reaction mixture for a period sufficient to produce from about 10% to about 90% by weight of the crystalline zeolite which may be produced theoretically from said reaction mixture.

11. The catalytic composite of claim 10 wherein said acid is a mineral acid.

12. The catalytic composite of claim 10 wherein said contacting of step (a) is of a duration sufficient to remove at least about 5% of said alumina content of said inorganic oxide.

13. The catalytic composite of claim 10 wherein said contacting of step (a) is of a duration sufficient to remove at least about 50% of said alumina content of said inorganic oxide.

14. The catalytic composite of claim 10 wherein prior to said contacting of step (a) said inorganic oxide is formed into particles having a cross sectional dimension greater than about 10 microns.

15. The catalytic composite of claim 10 wherein said inorganic oxide is a clay.

16. The catalytic composite of claim 10 wherein said inorganic oxide is kaolin.

17. The catalytic composite of claim 10 wherein said inorganic oxide is metakaolin.

18. The catalytic composite of claim 10 wherein the contacted inorganic oxide of step (a) is mixed with a crystalline aluminosilicate of the type desired in the particular catalytic composite to be prepared.

* * * * *